(12) United States Patent
Savoldi et al.

(10) Patent No.: US 7,324,438 B1
(45) Date of Patent: Jan. 29, 2008

(54) TECHNIQUE FOR NONDISRUPTIVELY RECOVERING FROM A PROCESSOR FAILURE IN A MULTI-PROCESSOR FLOW DEVICE

(75) Inventors: Mark Savoldi, Holly Springs, NC (US); Hong-Man Wu, Raleigh, NC (US); Kenneth H. Potter, Jr., Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 946 days.

(21) Appl. No.: 10/365,973

(22) Filed: Feb. 13, 2003

(51) Int. Cl.
*G01R 31/08* (2006.01)
*G06F 11/00* (2006.01)
*H04L 1/00* (2006.01)
*H04L 12/26* (2006.01)

(52) U.S. Cl. .......................... 370/216; 714/2
(58) Field of Classification Search ........ 370/216–218, 370/221; 714/2, 10
See application file for complete search history.

(56) References Cited

U.S. PATENT DOCUMENTS

| | | | |
|---|---|---|---|
| 5,161,156 A | 11/1992 | Baum et al. | |
| 5,519,704 A | 5/1996 | Farinacci et al. | |
| 5,764,641 A | 6/1998 | Lin | |
| 6,606,298 B1 | 8/2003 | Foltak | |
| 6,681,341 B1 | 1/2004 | Fredenburg et al. | |
| 6,757,803 B1 | 6/2004 | Lin et al. | |
| 2002/0167952 A1* | 11/2002 | Watson et al. | 370/401 |
| 2002/0172195 A1* | 11/2002 | Pekkala et al. | 370/360 |

* cited by examiner

*Primary Examiner*—Kevin C. Harper
(74) *Attorney, Agent, or Firm*—Cesari and McKenna LLP

(57) ABSTRACT

A technique non-disruptively recovers from a processor failure in a multi-processor flow device, such as an intermediate network node of a computer network. Data relating to a particular data flow of a processor within the node is tagged with specific information used to detect and recover from a failure of the processor without affecting data from other processors of the node. A data path management device tags the data with the specific information reflecting the processor issuing the data and a state of the processor. When the tagged data subsequently passes through the data path management device, the specific information is compared with current information for the issuing processor. If the comparison indicates that the specific information is valid, the data path management device forwards the related data flow through the node. If the comparison indicates that the specific information is invalid, the data and its related data flow are discarded and "cleanly" purged from the node.

31 Claims, 6 Drawing Sheets

TECHNIQUE FOR NONDISRUPTIVELY RECOVERING FROM A PROCESSOR FAILURE IN A MULTI-PROCESSOR FLOW DEVICE

FIELD OF THE INVENTION

This invention relates generally to multi-processor systems and, more specifically, to non-disruptively recovering from a processor failure in a multi-processor flow device, such as an intermediate network node of a computer network.

BACKGROUND OF THE INVENTION

A computer network is a geographically distributed collection of interconnected sub-networks for transporting data between nodes, such as computers. A local area net-work (LAN) is an example of such a sub-network; a plurality of LANs may be further interconnected by an intermediate network node, such as a router or switch, to extend the effective "size" of the computer network and increase the number of communicating nodes. The nodes typically communicate by exchanging discrete frames or packets of data according to predefined protocols. In this context, a protocol consists of a set of rules defining how the nodes interact with each other.

Each node typically comprises a number of basic components including a processor, a memory and an input/output (I/O) interface. To increase performance, a node may embody a multi-processor environment wherein a plurality of processors is coupled to a shared I/O interface via a management module. Typically, a workload is shared among the multiple processors either on a per-transaction basis or based on function. The processors may be general-purpose processors or processing cores of, e.g., a network processor. Often, all of the processors require access to the same shared interface in order to receive work (such as packets to be processed) and return the results of the processing. In this type of application or network processing system, individual processors may periodically fail, typically due to a software failure, and must be restarted. This temporary loss of one of the processors results in reduction of throughput, but should not affect the availability of the system.

In particular, a fault tolerant, high availability system must be able to recover cleanly from processor failures while minimizing the impact on the operation of the remaining processors. However, when a management module manages the data for multiple processors, it is often difficult to recover from a processor failure without affecting the data from the other processors, particularly when the data is intermixed within common destination ports and queues of the system. In a high availability network processing system, such as a multi-processor flow device, the data may be embodied as packets that comprise user information used to create a user session. An example of such a user session is a voice or packet "call" between two users over the computer network. A large number of user sessions may be allocated to the processors. If one processor fails, some user sessions may be lost, but the remaining sessions remain active so that the percentage of outage is relatively small.

An application particularly suited for this type of high-availability, multi-processor environment is a wireless networking application using, e.g., cellular phones to exchange information among the users. For this type of application, the multi-processor flow device is configured to provide session processing operations for each user. Wireless networks perform functions similar to that of "wired" networks in that the atmosphere, rather than the wires, provides a path over which the data may flow. Many users share the atmosphere using techniques that facilitate such sharing. Examples of a shared wireless network include a wireless local area network and a wireless asynchronous transfer mode network.

When the data of a failed processor is intermixed within shared queues of the multi-process flow device, it is desirable to remove (purge) that potentially "bad" (corrupted) data from the queues without affecting otherwise "good" data stored in those queues from the remaining processors. One prior approach used to recover from a processor failure within a multi-processor flow device involves resetting the management module and reinitializing all queues managed by that module. However, this approach results in lost data not only for the processor that failed, but also for all processors managed by the module.

Another prior approach used to recover from such a processor failure involves complete parsing of the queues by a host processor of the multi-processor flow device, searching for any corrupted data remaining from a failed processor and purging that corrupted data from the system. Yet, this approach results in lost performance and wasted memory bandwidth of the flow device. Therefore, it is desirable to purge corrupted data issued by a failed processor of a multi-processor flow device from queues of the device in an efficient manner that does not affect data from the remaining processors. The present invention is directed to solving this problem by providing a technique for recovering from a failure to a processor of a multi-processor flow device, such as an intermediate network node, without disturbing proper operation of the other processors.

SUMMARY OF THE INVENTION

The present invention overcomes the disadvantages of the prior art by providing a technique for non-disruptively recovering from a processor failure in a multi-processor flow device, such as an intermediate network node of a computer network. According to the technique, data relating to a particular data flow of a processor within the node is tagged with specific information used to detect and recover from a failure of the processor without affecting data from other processors of the node. A data path management device tags the data with the specific information reflecting the processor issuing the data and a state of the processor. When the tagged data subsequently passes through the data path management device, the specific information is compared with current information for the issuing processor. If the comparison indicates that the specific information is valid (i.e., the processor has not failed), the data path management device forwards the related data flow through the node. However, if the comparison indicates that the specific information is invalid (i.e., the processor has failed), the data and its related data flow are discarded and "cleanly" purged from the node.

In the illustrative embodiment, the data is a descriptor and one or more descriptors may be used to describe a packet of the data flow issued by the processor. The descriptor is tagged with the specific information by the data path management device prior to storing the tagged descriptor on a destination queue of the node. The specific information includes a source identifier (ID) of the processor issuing the descriptor and a disable count indicating a number of times the processor has been disabled (reset) at the time of tagging. When the tagged descriptor is subsequently retrieved from the destination queue, the data path management device uses (i) the source ID to determine which processor issued the descriptor and (ii) the tagged disable count to determine whether the processor has failed and, if so, that the descriptor is corrupted.

Specifically, when retrieving the tagged descriptor from the queue, the data path management device compares the tagged disable count with a current disable count of the processor. Notably, the current disable count changes whenever a failure of the processor is detected. If the counts match, the tagged descriptor is valid and the data path management device forwards the packet described by that descriptor through the node. If the counts do not match, the tagged descriptor and its described packet are "dropped" by the data path management device, and cleanly discarded and purged from the node.

Advantageously, the inventive technique prevents a failure in one processor from affecting the data flows for other unrelated processors of a multi-processor intermediate network node, such as a router or switch. The technique also obviates the need for extra memory bandwidth to handle processor accesses required to parse and flush queues (via software) as a result of the processor failure. That is, the technique eliminates the need to parse through the queues managed by the data path management device since the data from the failed processor is allowed to flow normally through the node. Hardware (logic) is configured to check the integrity of the data at one or more points throughout the node, thereby reducing the time needed to purge corrupted data from the node. The present technique thus allows the data path management device to cleanly recover from a processor failure without extra software intervention and without disrupting operation of the other processors.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
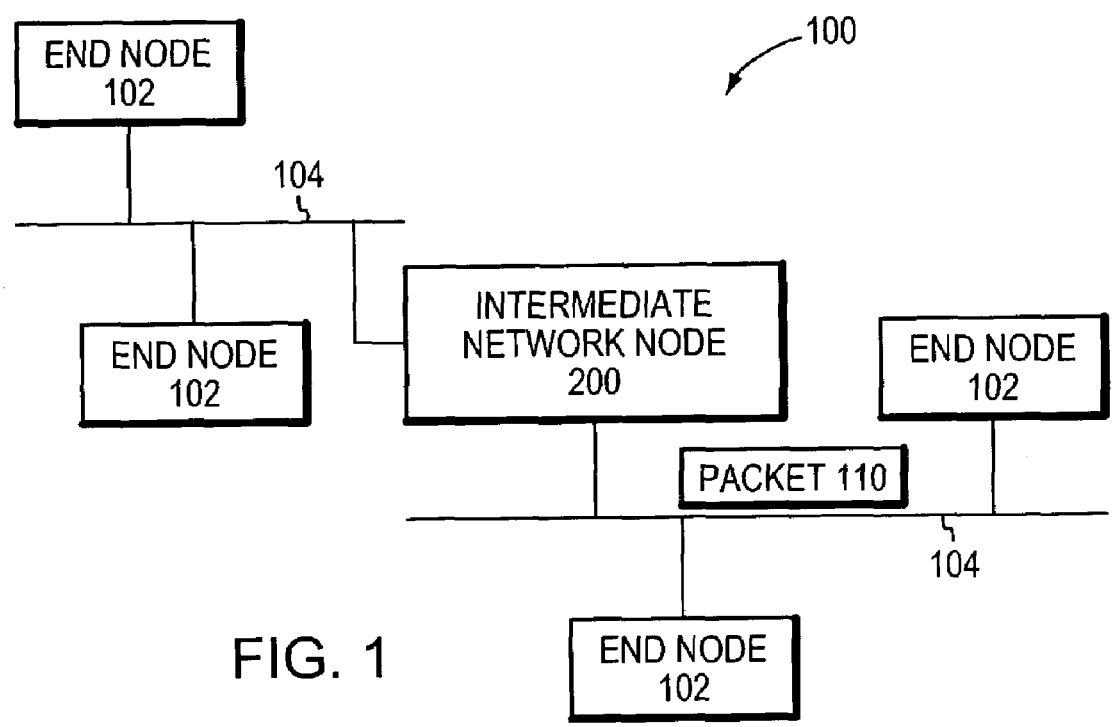
FIG. 1 is a schematic block diagram of a computer network comprising a collection of interconnected sub-networks and nodes.

FIG. 1 is a schematic block diagram of a computer network 100 comprising a collection of interconnected sub-networks and nodes. The nodes may comprise computers including end nodes 102 and an intermediate network node 200. Sub-networks 104 included within network 100 are illustratively local area networks (LANs) interconnected by the intermediate network node 200, although the networks may comprise other communication links such as wide area networks. Communication among the nodes coupled to the LANs is typically effected by exchanging discrete packets 110 among the nodes according to predefined protocols. In this context, a protocol consists of a set of rules defining how the nodes interact with each other.

Figure 2:
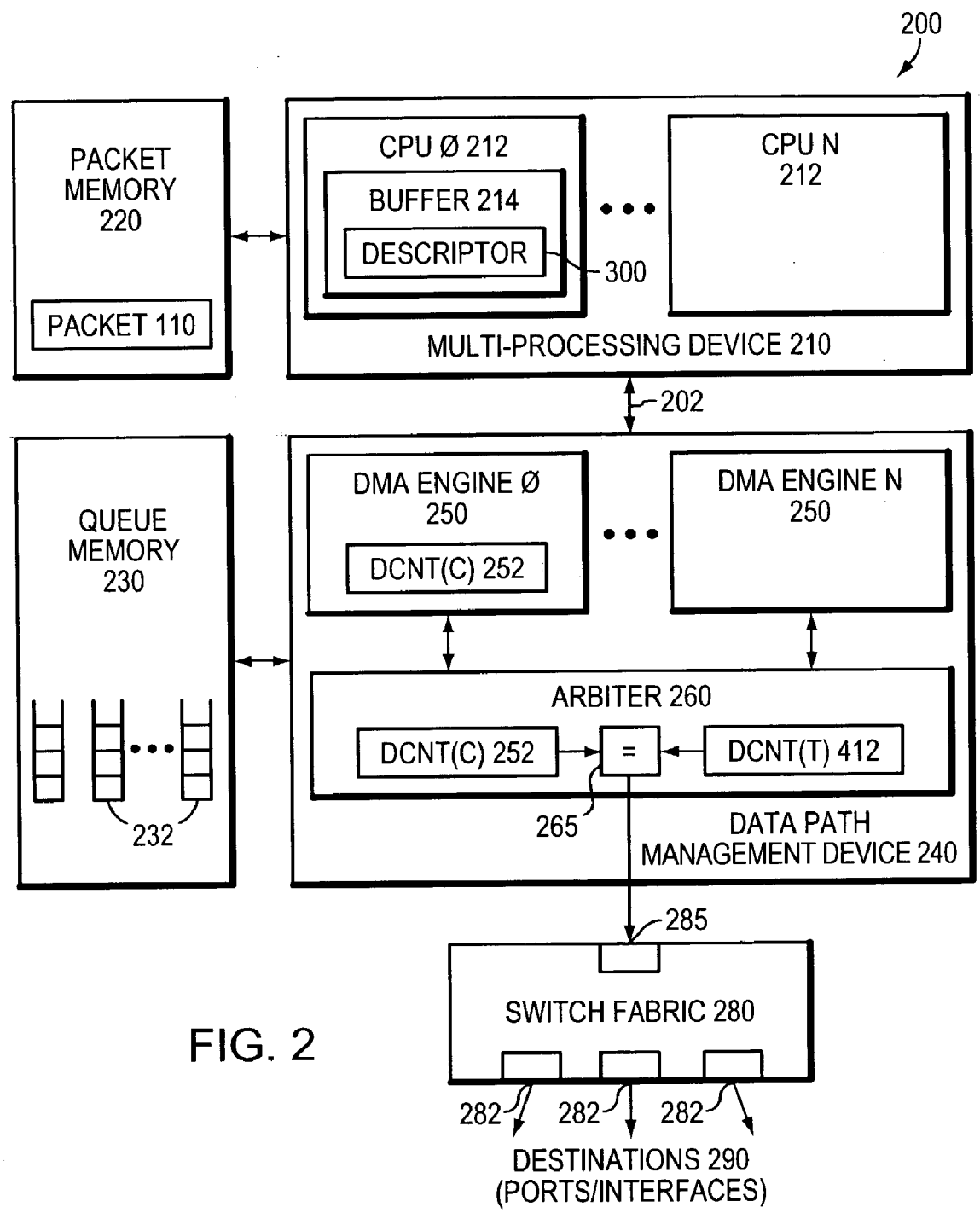
FIG. 2 is a schematic block diagram of an illustrative multi-processor flow device, such as an intermediate network node, which may be advantageously used with the present invention.

FIG. 2 is a schematic block diagram of an illustrative intermediate network node 200, such as a switch or router, which may be advantageously used with the present invention. The intermediate network node 200 is embodied as a multi-processor flow device having a plurality of processors 212, such as central processing units (CPU0-N), connected to a switch fabric 280 via a data path management device 240. The CPUs may be either general-purpose processors or processing cores of, e.g., a network processor that are further embodied as an application specific integrated circuit (ASIC) or a multiprocessing device 210. An example of a multi-processing device that may be advantageously used with the present invention is the SiByte SB-1250 dual processor MIPs system on a chip, available from Broadcom Corporation, Irvine, Calif.

The switch fabric 280 comprises a conventional switching device having a plurality of output switch ports 282 connected to various destinations, such as physical input/output interfaces or ports 290 of the node 200. An input switch port 285 couples the switch fabric 280 to the data path management device 240 and functions as a common interface resource that is shared among all of the processors 212 of the intermediate network node 200. As a result, the switch fabric 280 provides a de-multiplexing function that "fans-out" packets 110 received at the shared input switch port 285 to destination ports 290 coupled to the output switch ports 282. An example of such a shared resource is the common switch interface (CSIX) configured to transfer information between the processors 212 and switch fabric 280.

The multi-processing device 210 is coupled to a packet memory 220 configured to store packets 110 processed by the processors 212. The processors of the multi-processing device 210 are also coupled to the data path management device 240 over a communications link 202, such as the HyperTransport (HT) high speed, synchronous split transaction bus. The data path management device 240 comprises a plurality of direct memory access (DMA) controllers or engines 250 coupled to an arbiter 260. Each DMA engine 0-N is associated with a particular processor (CPU0-N), and cooperates with the arbiter 260 to process data issued by the processors 212 when transferring the packets 110 over the common, shared interface 285. The data issued by the processors include descriptors used to describe one or more packets of a data flow. Each processor 212 includes a buffer 214 used to hold a descriptor 300 created by the processor; the descriptor 300 is then passed directly to the DMA engine 250 associated with the processor without intervention of the packet memory 220.

Figure 3:
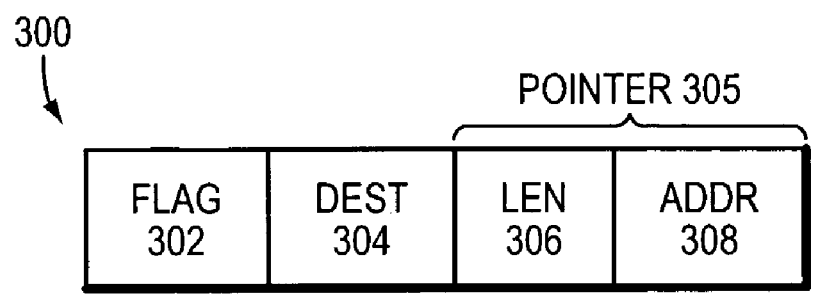
FIG. 3 is a schematic block diagram illustrating a format of a descriptor that may be advantageously used with the present invention.

FIG. 3 is a schematic block diagram illustrating the format of the descriptor 300 issued by a processor 212. The descriptor 300 includes a flag field 302 that stores one or more flags indicating, e.g., start of packet and end of packet, and a destination (dest) field 304 that stores an identifier (ID) of a port 290 of the node 200 that is the destination of the data flow (packet) described by the descriptor. The descriptor also includes a pointer 305 that references a location of the packet 110 in the packet memory 220 coupled to the multi-processing device 210. The packet pointer 305 is stored in two fields of the descriptor, a length (len) field 306 and an address (addr) field 308. The address field 308 stores a starting address of the packet 110 in packet memory 220, while the length field 306 stores the length of the packet 110 (e.g., in bytes).

The data path management device 240 stores the descriptors in a queue memory 230 coupled to the device 240 and manages retrieval of those descriptors from the queue memory 230 to thereby control access by the processors to the shared interface 285. The queue memory 230 is organized as a plurality of data structures, such as queues 232, configured to store the descriptors. Each queue 232 is associated with a destination port 290 of the node 200; therefore, the queues 232 are illustratively destination-based, as opposed to source-based, resources shared by the processors 212 of the node. As a result, descriptors issued by different processors may be stored in each destination queue 232 in random order. When a processor fails, its descriptors stored in one or more destination queues 232 may be "bad" (corrupted) and the present invention is directed to purging those potentially corrupted descriptors from the queues without disturbing otherwise "good" descriptors stored in the queues that are issued from other processors of the node.

Broadly stated, the present invention provides a technique for non-disruptively recovering from a processor failure in a multi-processor flow device, such as intermediate network node 200 of computer network 100. According to the technique, data relating to a particular data flow of a processor 212 is tagged with specific information used to detect and recover from a failure of the processor without affecting data from other processors of the node. Data path management device 240 tags the data with the specific information reflecting the processor issuing the data and a state of the processor 212. When the tagged data subsequently passes through the data path management device, the specific information is compared with current information for the issuing processor. If the comparison indicates that the specific information is valid (i.e., the processor has not failed), the data path management device 240 forwards the related data flow through the node. However, if the comparison indicates that the specific information is invalid (i.e., the processor has failed), the data and its related data flow are discarded and "cleanly" purged from the node.

To that end, each DMA engine 250 of the data path management device 240 comprises conventional logic configured to tag each descriptor 300 issued by a processor with specific information. According to the invention, the specific information includes a source ID of the processor 212 issuing the descriptor (i.e., a CPU ID) and a disable count, DCNT (T), indicating a state of the processor 212, i.e., a number of times the processor has been disabled (reset) at the time of tagging. In addition, each DMA engine 250 maintains a current disable count, DCNT (C) 252, for its associated processor 212. The current disable count 252 is a current count value of the number of times that the processor 212 has been disabled. At the time of tagging the descriptor 300 with the specific information, the DMA engine 250 places the value of DCNT (C) into the value of DCNT (T).

Figure 4:
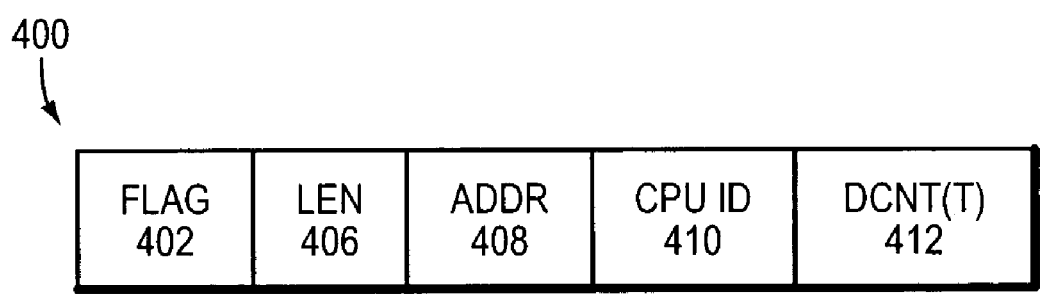
FIG. 4 is a schematic diagram illustrating a format of a tagged descriptor according to the present invention.

FIG. 4 is a schematic diagram illustrating the format of a tagged descriptor 400 that includes specific information provided by the data path management device 240. The tagged descriptor 400 includes a flag field 402, a length (len) field 406 and an address (addr) field 408 that store values similar to the values stored in those respective fields of descriptor 300. In addition, the tagged descriptor 400 includes a CPU ID field 410 that stores the ID of the processor issuing the descriptor 300 and a DCNT (T) field 412 that stores a disable count value indicating the number of times that the processor 212 has been disabled at the time of tagging. Note that the destination field 304 of the descriptor 300 is not included within the tagged descriptor 400 because the destination ID information provided by that field is embedded within the destination queues 232 of the queue memory 230.

In the illustrative embodiment, each processor 212 creates a descriptor 300 that indicates, among other things, the destination 304 of a packet 110 described by the descriptor and passes that descriptor 300 to its associated DMA engine 250. Although a single descriptor may be all that is required to forward a packet 110 (e.g., a short packet) of a data flow from the packet memory 220 and through the switch fabric 280 to a destination port 290, it is possible to have several descriptors describe one packet. The DMA engine processes the descriptor 300 by (i) extracting the destination ID from the destination field 304 of the descriptor, (ii) determining (from the extracted destination ID) into which queue 232 of queue memory 230 to load the descriptor, and (iii) adding the CPU ID and DCNT (T) fields 410 and 412, respectively, to the tagged descriptor 400. The DMA engine 250 then loads the tagged descriptor onto the appropriate destination queue 232.

Since the input switch port 285 of the switch fabric 280 is a resource shared by the processors 212, an arbitration policy is needed to determine which processor may have access to that shared resource. The arbiter 260 comprises conventional logic configured to execute an arbitration policy that determines which queue 232 within the queue memory 230 to service next in order to forward a packet 110 described by a tagged descriptor 400 over the shared interface 285. In the illustrative embodiment, the arbitration policy is implemented as a weighted round robin (WRR) arbitration algorithm. The arbiter retrieves the tagged descriptors 400 from the various queues 232 in accordance with the arbitration policy and cooperates with the DMA engines 250 to transfer the packets 110 described by those descriptors 400 over the shared interface 285.

Upon selecting a destination queue 232 to service, the arbiter 260 retrieves the tagged descriptor 400 from the queue and compares the DCNT (T) count value in field 412 of the descriptor with the current DCNT (C) count value 252 associated with the processor 212. If the count values are not equal, the arbiter 260 "drops" (discards) the tagged descriptor 400 and its described packet is purged from the node by, e.g., being overwritten in processor memory 220. However, if the disable count values are equal, the packet 110 described by the descriptor 400 is valid. The arbiter 260 then cooperates with the DMA engine 250 associated with the processor 212 to retrieve the packet from packet memory 220 and forward that packet over the shared interface 285 for transfer through the switch fabric 280.

Specifically, a comparator 265 of the arbiter 260 compares the tagged disable count 412 with the current disable count 252 associated with the processor 212. If the processor 212 has not failed during the time the descriptor 400 is stored in queue memory 230, the tagged disable count 412 equals the current disable count 252 and the packet data described by the tagged descriptor 400 is considered valid. Therefore, the packet 110 is transferred from the packet memory 220 over the shared interface 285 to the switch fabric 280. However, if the processor 212 has failed during the time the tagged descriptor 400 is stored in queue memory 230, the current disable count 252 is "bumped" (incremented) such that the subsequent comparison operation indicates that the two disable counts do not match. That is, the current disable count 252 changes whenever a failure of the processor is detected. Thus, the packet data described by the descriptor is considered invalid and the tagged descriptor 400 is discarded.

In the illustrative embodiment, the DCNT (C) and DCNT (T) values are implemented by, e.g., 8-bit disable counters. It should be noted that the size of each disable counter can vary as long as the counter is sufficiently large to avoid wrapping so as to obviate any latencies associated with such a "wrap around" condition. That is, the counters used to implement the disable counts can be of any sufficient size that obviates a wrap around condition. The arbiter 260 selects the proper current disable count DCNT (C) for comparison with the tagged disable count DCNT (T) by examining the CPU ID 410 of the descriptor 400. The CPU ID 410 stored in descriptor 400 allows the arbiter 260 to select (i) the appropriate DCNT (C) 252 (per CPU) for comparison with the DCNT (T) 412, and (ii) to which DMA engine it issues a command to retrieve the associated packet when the disabled counts match. Moreover, the DMA engine 250 uses the length 406 and address 408 from the tagged descriptor 400 to retrieve the packet 110 described by the descriptor 400 from the packet memory 220 for transfer over the shared interface 285.

In response to a failure, each processor 212 executes a recovery sequence that includes re-initialization of, e.g., its memory space. Immediately upon re-initialization, the processor 212 informs its DMA engine 250 to increment the current disable count 252 to ensure coherency/consistency of the packet data stored in the packet memory 220. That is, the processor may overwrite corrupted packets stored in the packet memory when reinitializing that memory. If the DMA engine 250 is not immediately informed that the integrity of the packets stored in the packet memory (as described by the descriptors 400 in the queue memory 230) are "suspicious", then the engine 250 may attempt to access that data.

In addition, if the DMA engine 250 associated with the processor 212 realizes an error has occurred on its interface to that processor, it may independently increment the current disable count 252. For example, if the DMA engine 250 realizes that the processor incorrectly formulates the descriptor 300, the DMA engine increments the current disable count 252 for that processor without instruction from the processor. From that point on, any tagged descriptors 400 previously stored in the queue memory 230 for that processor are considered invalid. If the communication link 202 coupling the multiprocessing device 210 to the data path management device 240 fails, then all DMA engines associated with all processors 212 on that device 210 increment their current disable counts 252 for those "failed" processors.

An advantage of the present invention is that the data path management device 240 does not have to "purge" the destination queues 232 in queue memory 230 for potentially corrupted data issued from a failed processor. The potentially corrupted data flows "naturally" from the destination queues and is discarded by the arbiter 260 prior to transferring the described packet 110 through the node. The technique is thus efficient because the corrupted data is purged at the time when the queue 232 would be serviced during normal operation. In addition, the purging procedure is performed fast and cost effectively from a resource consumption point of view, i.e., there is no need to access the packet 110 in packet memory 220 in order to purge that data.

Figure 5A:
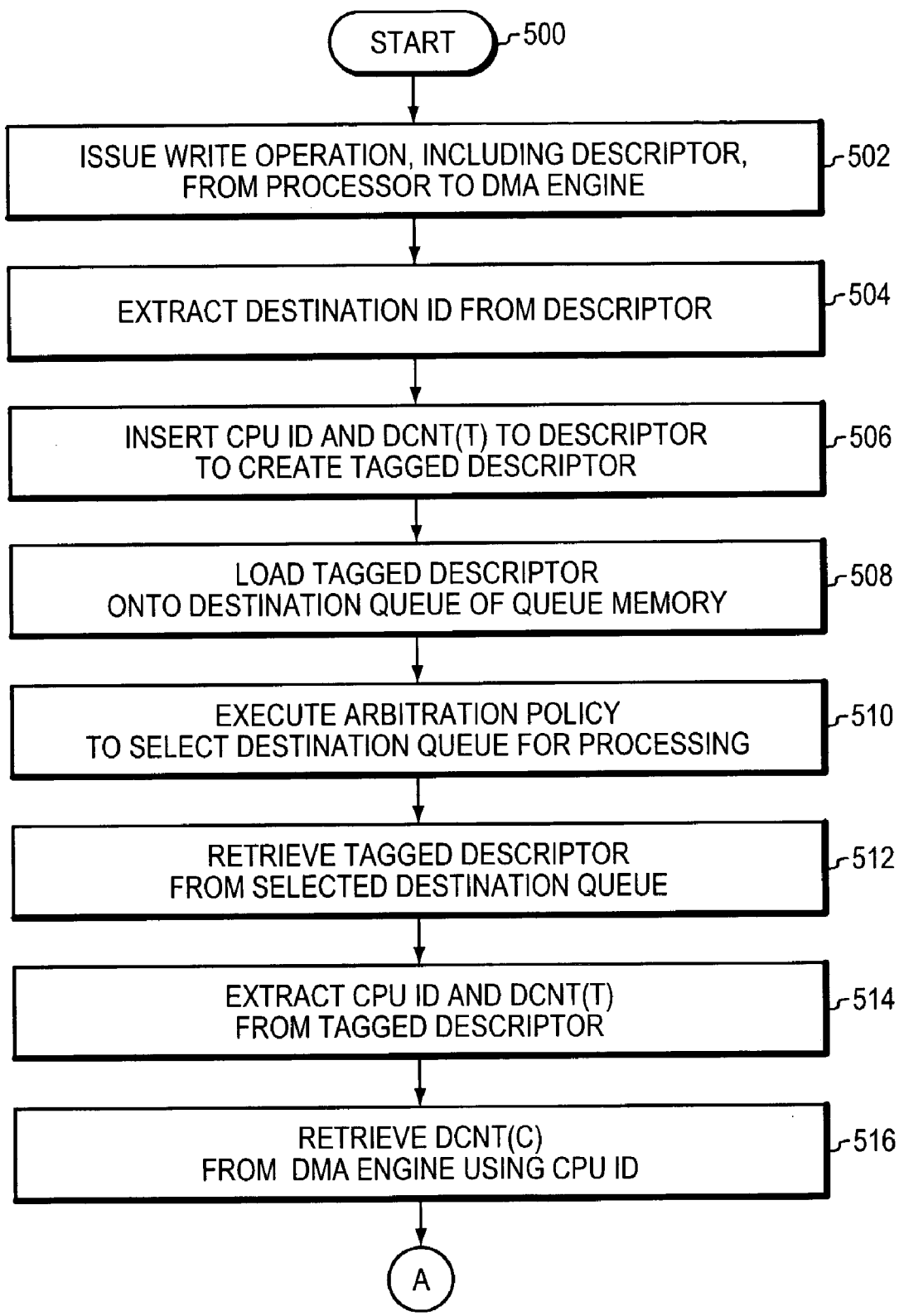
FIGS. 5A and 5B are flowcharts illustrating a sequence of steps used to implement a non-disruptive recovery technique according to the present invention.
Figure 5B:
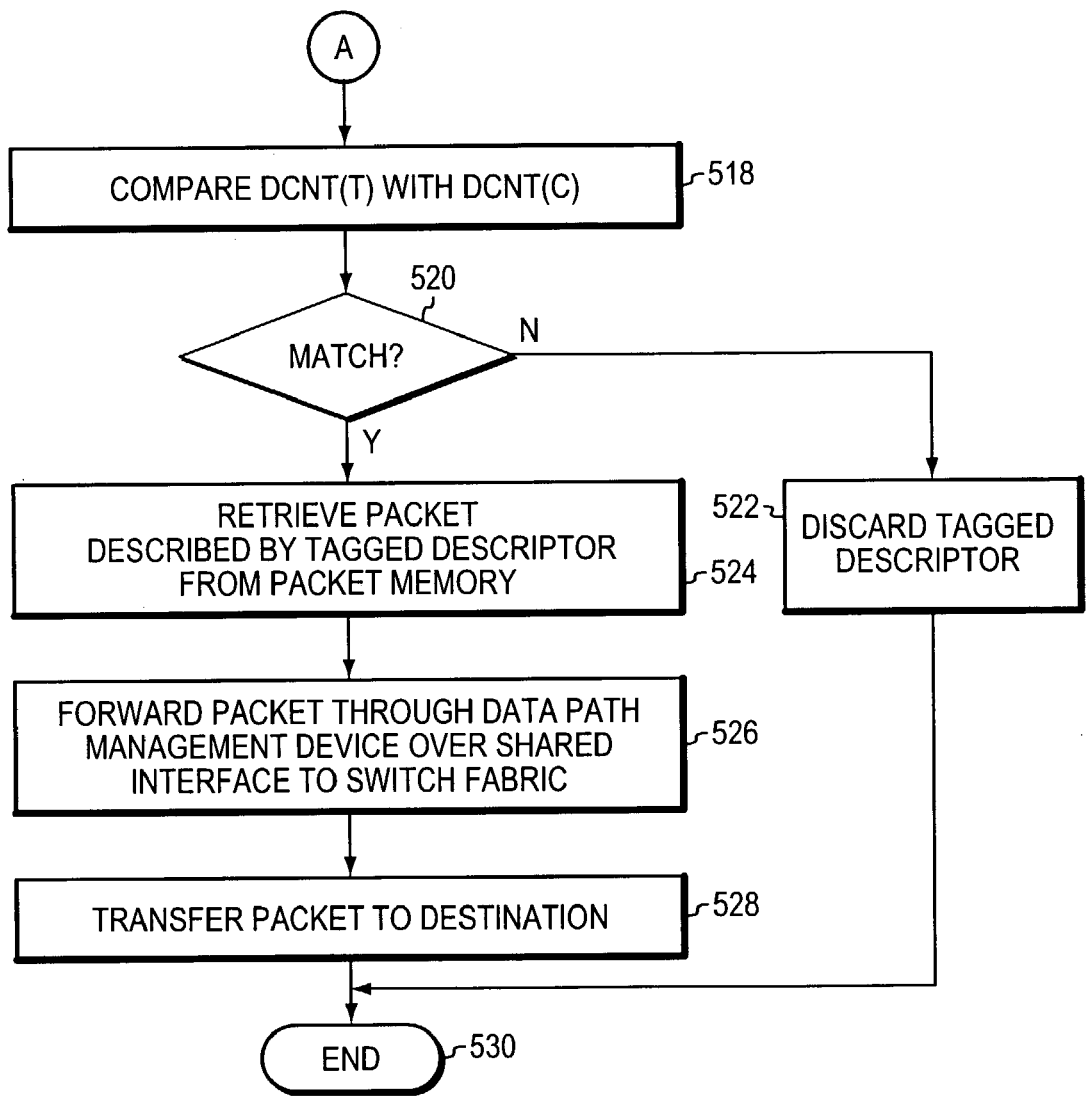

FIGS. 5A and 5B are flow charts illustrating a sequence of steps used to implement the non-disruptive recovery technique of the present invention. The sequence starts at Step 500 and proceeds to Step 502 where a processor 212 issues a write operation including write data (descriptor 300) to its DMA engine 250 to forward a packet of a data flow over the shared interface 285 of the switch fabric 280 to a destination port 290. Upon receiving the write operation and data (descriptor), the DMA engine 250 extracts the destination ID from field 304 of descriptor 300 in Step 504, and inserts CPU ID 410 and DCNT (T) 412 to thereby create the tagged descriptor 400 in Step 506. In Step 508, the DMA engine 250 loads the tagged descriptor 400 onto an appropriate destination queue 232 of the queue memory 230 as specified by the extracted destination ID. As noted, the destination ID is eliminated from the tagged descriptor 400 because that information is embedded into the destination queue 232.

In Step 510, the arbiter executes its arbitration policy to select a destination queue 232 for servicing. In Step 512, the arbiter retrieves the tagged descriptor 400 from the selected destination queue 232 and, in Step 514, parses that descriptor 400 to extract the CPU ID 410 and tagged DCNT (T) 412. In Step 516, the arbiter utilizes the CPU ID 410 to retrieve the appropriate DCNT (C) 252 from the DMA engine 250 associated with the processor 212. In Step 518, the arbiter compares the DCNT (T) with the DCNT (C) to determine whether there is a match (Step 520). If not, the tagged descriptor 400 is discarded in Step 522 and the sequence ends in Step 530. However, if the disabled counts match, then the arbiter 260 cooperates with the DMA engine 250 to retrieve the packet 110 described by the tagged descriptor 400 from packet memory 220 (using the length 406 and address 408 of the descriptor 400) in Step 524. The packet 110 is then forwarded from packet memory 220 through the data path management device 240 and over the shared interface 285 to the switch fabric 280 (Step 526). The switch fabric then transfers the packet to the appropriate destination 290 in Step 528 and the sequence ends in Step 530.

In summary, the inventive technique prevents a failure in one processor from affecting the data flows for other unrelated processors of a multi-processor intermediate network node, such as a router or switch. The technique also obviates the need for extra memory bandwidth to handle processor accesses required to parse and flush queues (via software) as a result of the processor failure. That is, the technique eliminates the need to parse through the queues managed by the data path management device since the data from the failed processor is allowed to flow normally through the node. Hardware (logic) is configured to check the integrity of the data at one or more points throughout the node, thereby reducing the time needed to purge corrupted data from the node. The present technique thus allows the data path management device to cleanly recover from a processor failure without extra software intervention and without disrupting operation of the other processors.

Figure 6:
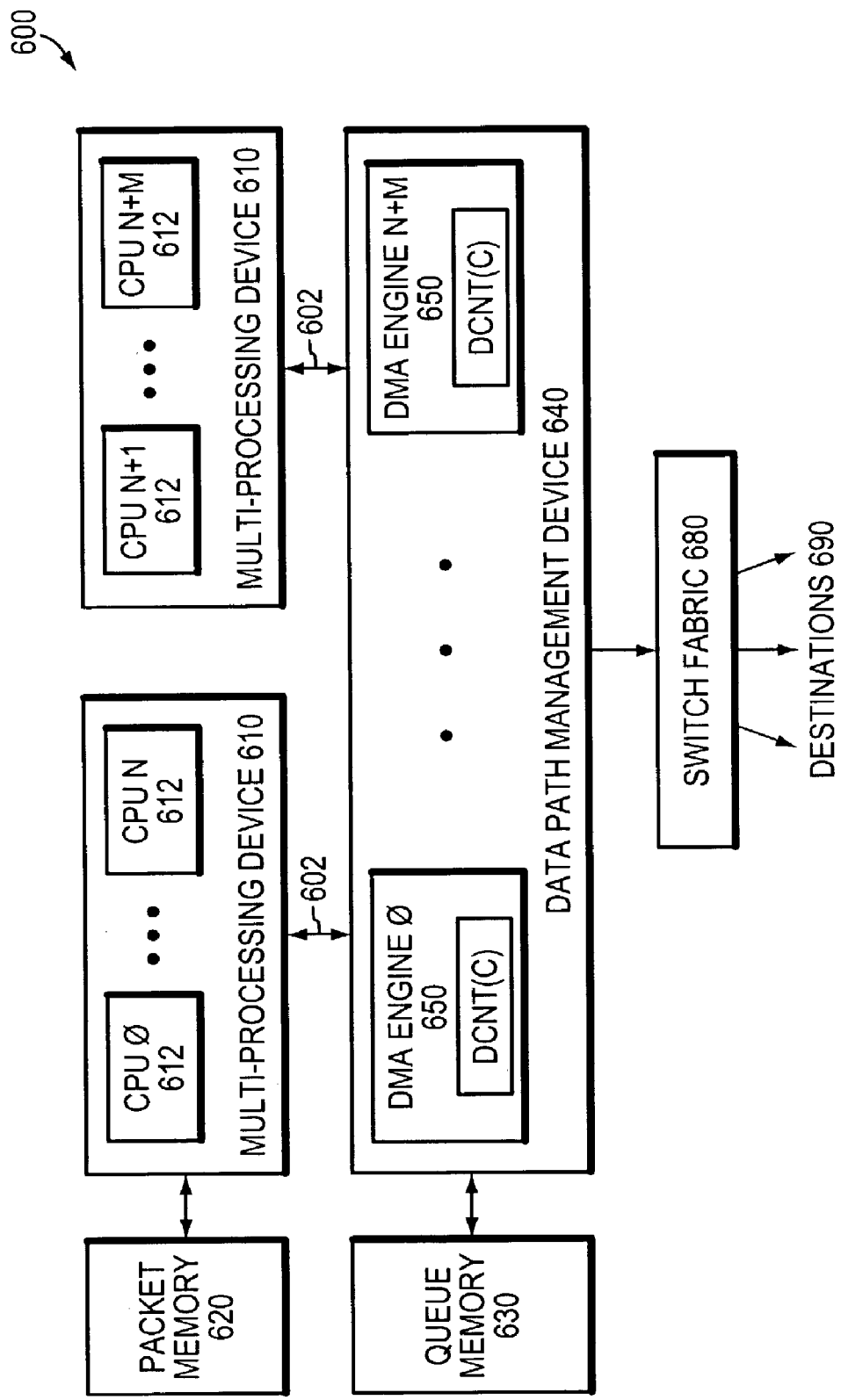
FIG. 6 is a schematic block diagram of an alternate embodiment of an intermediate network node that may be advantageously used with the present invention.

While there has been shown and described an illustrative embodiment for non-disruptively recovering from a processor failure in a multi-processor flow device, such as an intermediate network node of a computer network, it is to be understood that various other adaptations and modifications may be made within the spirit and scope of the present invention. For example, in an alternate embodiment of the invention, there may be a plurality of multi-processing devices in the node, each of which includes a plurality of processors. FIG. 6 is a schematic block diagram of an alternate embodiment of an intermediate network node 600, such as a switch or router, which may be advantageously used with the present invention. Each multi-processing device 610 of node 600 is coupled to a data path management device 640 via a separate communication link 602. If one of the communication links 602 fails, then all DMA engines 650 associated with all processors 612 on the device 610 coupled to that failed link 602 automatically increment their current disable counts DCNT (C) for those "failed" processors. Notably, the current disable counts DCNT (C) associated with the processors 612 of the device 610 coupled to the functioning (non-failed) communication link 602 are not incremented.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system adapted to non-disruptively recover from a processor failure in an intermediate network node having a plurality of processors, the system comprising:
    a memory configured to store data relating to a data flow of a processor of the node, the data tagged with specific information reflecting the processor issuing the data and a state of the processor at a time of tagging; and
    a device coupled to the memory and configured to compare the state of the processor at the time of tagging with a current state of the processor and if the comparison indicates that the processor has failed, purge the data and its related data flow from the node without affecting data of other processors of the node.

2. The system of claim 1 wherein the device is a data path management device comprising a plurality of direct memory access (DMA) engines coupled to an arbiter.

3. The system of claim 2 wherein the specific information reflecting the processor issuing the data comprises an identifier (ID) of the processor and the specific information reflecting the state of the processor at the time of tagging comprises a disable count, DCNT (T), indicating a number of times the processor has been disabled at the time of tagging.

4. The system of claim 3 wherein the current state of the processor comprises a current disable count, DCNT (C), indicating a current count of the number of times that the processor has been disabled.

5. The system of claim 4 wherein the arbiter compares DCNT (T) with DCNT (C) to determine whether the processor has failed.

6. The system of claim 5 wherein each DMA engine is associated with a processor of the node, each DMA engine configured to tag the data issued by its associated processor with the specific information and each DMA engine further configured to maintain the current disable count, DCNT (C), of its associated processor.

7. The system of claim 6 wherein the data flow comprises one or more packets and wherein, in response to the comparison indicating that the processor has not failed, the DMA engine cooperates with the arbiter to transfer the one or more packets of the related data flow through the node.

8. The system of claim 7 wherein the data is a descriptor and wherein one or more descriptors describe a packet of the related data flow.

9. The system of claim 8 wherein the memory is a queue memory organized as a plurality of queues configured to store the descriptor.

10. The system of claim 9 wherein the intermediate network node has a plurality of destination ports and wherein each queue of the queue memory is associated with a destination port of the node.

11. The system of claim 10 wherein the intermediate network node is one of a router and switch.

12. A method for non-disruptively recovering from a processor failure in a multi-processor flow device, the method comprising the steps of:
    tagging data relating to a data flow of a processor with specific information used to detect and recover from a failure of the processor;
    comparing the specific information retrieved from the tagged data with current information for the issuing processor; and
    if the step of comparing indicates that the processor has failed, purging the data and its related data flow without affecting data from other processors of the multi-processor flow device.

13. The method of claim 12 further comprising the step of, if the step of comparing indicates that the processor has not failed, forwarding the data flow related to the tagged data through the multi-processor flow device.

14. The method of claim 12 further comprising the steps of:
    storing the tagged data in a queue memory of the multi-processor flow device; and
    retrieving the tagged data from the queue memory in accordance with an arbitration policy.

15. An apparatus for non-disruptively recovering from a processor failure in a multi-processor flow device, the apparatus comprising:
    means for tagging data relating to a data flow of a processor with specific information used to detect and recover from a failure of the processor;
    means for comparing the specific information retrieved from the tagged data with current information for the issuing processor; and
    means for discarding the data and its related data flow if the means for comparing indicates that the processor has failed, without affecting data from other processors of the multi-processor flow device.

16. The apparatus of claim 15 further comprising, means for forwarding the data flow related to the tagged data through the multi-processor flow device, if the means for comparing indicates that the processor has not failed.

17. A computer readable medium containing executable program instructions for non-disruptively recovering from a processor failure in a multi-processor flow device, the executable program instructions comprising program instructions for:
    tagging data relating to a data flow of a processor with specific information used to detect and recover from a failure of the processor;
    comparing the specific information retrieved from the tagged data with current information for the issuing processor; and
    if the step of comparing indicates that the processor has failed, discarding the data and its related data flow without affecting data from other processors of the multi-processor flow device.

18. The computer readable medium of claim 17 further comprising program instructions for, if the step of comparing indicates that the processor has not failed, forwarding the data flow related to the tagged data through the multi-processor flow device.

19. A system adapted to non-disruptively recover from a processor failure in an intermediate network node having a plurality of processors, the system comprising:
- a queue memory organized as a plurality of destination queues configured to store descriptors describing packets processed by the plurality of processors; and
- a data path management device coupled to the queue memory and configured to tag the descriptors with specific information prior to storing the tagged descriptors on the destination queues, the specific information used to detect and recover from failure of a processor, the data path management device further configured to compare the specific information retrieved from the tagged descriptors with current information for the processors and, if the comparison indicates that a processor has failed, discard the tagged descriptor and purge the tagged descriptor's described packet without disrupting operation of the other processors of the node.

20. The system of claim 19 further comprising a switch fabric having an input switch port and a plurality of output switch ports connected to destination ports of the node, the input switch port configured as a common interface that is shared among all of the processors of the intermediate network node, and the data path management device configured to manages retrieval of the tagged descriptors from the destination queues to control access by the processors to the shared common interface when forwarding packets to the destination ports.

21. An apparatus comprising:
- a queue configured to store data issued from a processor of a plurality of processors of the apparatus, the data tagged with a source identifier that identifies that data as from the processor and a disable count that indicates a number of times the processor has been disabled as of the time the data was tagged; and
- a data path management device configured to compare the disable count tagged to the data with a current disable count for the processor, the current disable count indicating the number of times the processor has been disabled as of a current time, the data path management device further configured to purge the data if the comparison indicates that the processor has been disabled since the time the piece of data was tagged.

22. The apparatus of claim 21 wherein the data path management device comprises a direct memory access (DMA) engine associated with the processor, the DMA engine configured to tag the data when the data is issued from the processor and place the data in the queue, and subsequently retrieve the data from the queue.

23. The apparatus of claim 22 wherein the DMA engine further comprises an arbiter, the arbiter configured to perform the comparison of the disable count tagged to the data with the current disable count for the processor.

24. The apparatus of claim 21 wherein the data path management device is further configured to maintain the current disable count for the processor.

25. The apparatus of claim 24 wherein the processor is configured to execute a recovery sequence in response to detection of a failure, the recovery sequence including informing the data management device to increment the current disable count of the processor.

26. The apparatus of claim 21 wherein the data is a descriptor and wherein one or more descriptors describe a packet of a data flow issued by the processor.

27. A method comprising:
- storing data issued from a processor of a plurality of processors, the data tagged with a source identifier that identifies that data as from the processor and a disable count that indicates a number of times the processor has been disabled as of the time the data was tagged;
- comparing the disable count tagged to the data with a current disable count for the processor, the current disable count indicating the number of times the processor has been disabled as of a current time; and
- purging the data if the comparing indicates that the processor has been disabled since the time the piece of data was tagged.

28. The method of claim 27 wherein the data is tagged by a direct memory access (DMA) engine associated with the processor.

29. The method of claim 27 further comprising:
- maintaining the current disable count for the processor at a direct memory access (DMA) engine associated with the processor.

30. The method of claim 29 further comprising:
- executing a recovery sequence by the processor in response to detection of a failure, the recovery sequence including informing the direct memory access (DMA) engine to increment the current disable count of the processor.

31. The method of claim 27 wherein the data is a descriptor and wherein one or more descriptors describe a packet of a data flow issued by the processor.

* * * * *